(12) United States Patent
Bunker

(10) Patent No.: US 7,314,072 B2
(45) Date of Patent: Jan. 1, 2008

(54) INTEGRAL PRESSURE REGULATION SYSTEM FOR TIRES AND OTHER VESSELS CONTAINING COMPRESSIBLE FLUIDS

(76) Inventor: Grant Bunker, 838 Highland Ave., Oak Park, IL (US) 60304

( * ) Notice: Subject to any disclaimer, the term of this patent is extended or adjusted under 35 U.S.C. 154(b) by 122 days.

(21) Appl. No.: 11/116,863

(22) Filed: Apr. 28, 2005

(65) Prior Publication Data

US 2006/0021690 A1 Feb. 2, 2006

Related U.S. Application Data

(60) Provisional application No. 60/591,823, filed on Jul. 28, 2004.

(51) Int. Cl.
*B60C 23/12* (2006.01)
(52) U.S. Cl. .................. 152/419; 152/415; 152/418
(58) Field of Classification Search ............... 152/415, 152/418, 419, 429, DIG. 7, DIG. 11; 473/593; 441/80, 90, 95, 98; 417/233
See application file for complete search history.

(56) References Cited

U.S. PATENT DOCUMENTS

| | | | |
|---|---|---|---|
| 690,935 A | | 1/1902 | Ducasble |
| 1,041,216 A | * | 10/1912 | Woods ...................... 152/429 |
| 1,925,031 A | * | 8/1933 | Chitester ................. 152/342.1 |
| 2,167,398 A | * | 7/1939 | Tubbs ....................... 152/418 |
| 2,680,463 A | | 6/1954 | Khalil |
| 3,119,617 A | * | 1/1964 | Topper ...................... 473/593 |
| 3,480,064 A | * | 11/1969 | Huber ..................... 152/340.1 |
| 4,293,017 A | * | 10/1981 | Lambe .................... 152/339.1 |
| 4,349,064 A | | 9/1982 | Booth |
| 4,651,792 A | * | 3/1987 | Taylor ....................... 152/415 |
| 4,922,984 A | | 5/1990 | Dosjoub et al. |
| 4,995,438 A | * | 2/1991 | Weber et al. ............... 152/518 |
| 5,052,456 A | | 10/1991 | Dosjoub |
| 5,109,905 A | * | 5/1992 | Lambe .................... 152/342.1 |
| 5,301,729 A | * | 4/1994 | Blair ....................... 152/342.1 |
| 5,479,976 A | | 1/1996 | Cho |
| 5,538,061 A | * | 7/1996 | Blair ....................... 152/342.1 |
| 5,556,489 A | * | 9/1996 | Curlett et al. ............... 152/418 |
| 5,746,850 A | | 5/1998 | Luscher et al. |
| 6,367,528 B1 | | 4/2002 | Colantonio et al. |

FOREIGN PATENT DOCUMENTS

WO   WO 92/08621   5/1992

* cited by examiner

*Primary Examiner*—Jason R. Bellinger
*Assistant Examiner*—Kip Kotter
(74) *Attorney, Agent, or Firm*—Pauley Petersen & Erickson

(57) ABSTRACT

An inflation and pressure regulation system for inflatable vessels, such as tires, has a main chamber containing a volume of compressible fluid, such as air, and a pump chamber which acts to maintain the fluid in the vessel at a desired pressure. The pump chamber has a rigid, fluid-tight wall facing the main chamber and a flexible wall which is part of, or adjacent to, the wall of the vessel that can be deformed under use. A fluid channel extending between the pump chamber and a source of ambient fluid admits fluid into the pump chamber. A first check valve positioned between the fluid channel and the pump chamber permits one-way flow of fluid from the exterior of the vessel into the pump chamber while it is uncompressed. A second check valve permits one-way passage of fluid from the pump chamber, when it is compressed, into the main chamber. One or more valves can be used to prevent over-inflation of the main chamber.

19 Claims, 3 Drawing Sheets

INTEGRAL PRESSURE REGULATION SYSTEM FOR TIRES AND OTHER VESSELS CONTAINING COMPRESSIBLE FLUIDS

This Patent Application claims priority to U.S. Provisional Application No. 60/591,823; filed 28 Jul. 2004.

BACKGROUND OF THE INVENTION

It is essential to maintain correct air pressure within vehicle tires for their safe and efficient operation and the maximal life of the tires. Current methods of pressure regulation require periodic monitoring and correction of the pressure, which is usually accomplished by manual methods. If the measured pressure is low, air is normally provided by an external supply of compressed air or directly from a pump. These manual methods are tedious, require regular attention, and are often neglected. Under-inflation of tires compromises safety, fuel efficiency, and tread life.

Similar manual methods are used to maintain pressure within other vessels such as sporting balls, e.g., soccer balls, basketballs, footballs, and other air or fluid filled vessels. The balls regularly need to be pumped up by external means, which is a nuisance. It is thus desirable to have a more automated method of monitoring pressure and refilling, i.e., inflating, various forms of tires and other vessels containing compressible fluids.

Automated means for inflating tires have been suggested in the known art. However, some automated systems previously suggested for this purpose can require the use of an external compressed air source. Some of the suggested means of automatic inflation can suffer from complicated physical apparatus, thus incurring additional expense and mechanical fatigue. Some systems may require alterations to standard, universally used, tire maintenance and installation procedures. These complications and expenses can be serious drawbacks to the implementation of automatic inflation means.

SUMMARY OF THE INVENTION

The present invention provides a combination of a pressure regulating system and means of injecting air at sufficient pressure into an inflatable vessel having a deformable portion as matched to an appropriate energy source. In one embodiment, the present invention provides a system for automatic tire inflation of a pneumatic tire to a pre-selected inflation pressure, thus allowing the tire to simply inflate itself to the required degree. The present system is economical, mechanically simple and is easily integrated into existing tire technologies. In some embodiments, the present invention will allow for changing the pressure to which the tire may self-inflate.

In certain embodiments the present invention provides the basis for a self-maintaining inflatable tire that can be used and installed in the same manner as conventional tires. The present invention makes use of the fact that the forces exerted on the deformable tire itself, through its rolling motion, can be used to provide air pressure to reinflate an under-inflated tire. It is well known that driving on an under-inflated tire requires extra energy, which ordinarily is wastefully converted to additional tire wear and heat, through flexing of the tire. The present invention uses this deformation energy to re-inflate the tire, and control the tire pressure through use of a suitable regulation system to avoid over-inflation of the tire, thus making the tire largely self-maintaining.

In a similar manner, the repeated deformation suffered by an inflated sporting ball under normal use could be sufficient to provide the energy to maintain its correct inflation. The present invention can thus be applied to sporting balls, or other fluid filled vessels with deformable walls, as well. For ease of discussion hereinafter, the present invention will refer specifically to tires, it being understood that the principles of the present invention are not limited to tires.

According to the present invention a pressure regulation system for pneumatic tires can have within the tire an outer, or main, chamber containing a volume of compressible fluid such as air, the fluid being maintained at a desired pressure by an inner, or pump, chamber which acts to inflate the main chamber. The pump chamber can include a rigid, fluid-tight wall facing the fluid volume of the main chamber and a flexible wall which can be part of the vessel itself, such as an outer wall or tread wall of the tire, that is deformed under use. The pressure regulation system can further include a fluid channel extending between the pump chamber and an exterior of the tire, with the fluid channel admitting ambient air into the pump chamber. Valving for the pressure regulation and inflation system may include a first valve positioned between the pump chamber and the outer chamber, the first valve being a check valve permitting the ambient fluid to pass from the exterior of the tire into the pump chamber while it is uncompressed, and preventing fluid flow in the reverse direction. A second valve can be positioned between the pump chamber and the main chamber of the tire, with the second valve being a check valve permitting fluid to pass from the pump chamber while it is compressed, to the main chamber, and preventing fluid flow in the reverse direction. A pressure control system, such as a relief valve or other controllable setpoint valves operably positioned with respect to at least one of the pump chamber and the outer chamber can maintain the desired pressure in the main chamber.

Thus, in the present invention the self-inflation and pressure regulation system can be integrated into the tire itself rather than retrofitted as an add-on device. As the mechanism can be incorporated into an inner surface of the tire, the outer treads, sidewalls and sealing beads need not be affected. The external appearance of the tires thus need not be affected either. A tire according to the present invention could be used in exactly the same manner as conventional tires, and could use exactly the same wheels and standard installation equipment, except the tire would have the added benefit of being self-inflating to a desired pressure. The integrated design of the present invention can result in lower manufacturing costs and support costs, and encourage more universal deployment of self-inflating tires because its use would be transparent for both the end user and tire service personnel.

The benefits to society will include simplified maintenance, better vehicle safety and highway safety due to fewer tire failures and less frequent loss of truck retreads, longer tread life, and better fuel economy. Universal utilization of properly inflated tires would increase fuel economy, potentially representing gasoline savings of millions of gallons per year. The incremental costs of the present invention could be very low and would result in net savings to the tire owner because of reduced fuel use and improved tire life. These benefits would be worth the low incremental cost to the consumer, thus allowing the tire manufacturer to achieve sufficient profits for addition of the invention to pneumatic tires despite the improved tire lifetime.

BRIEF DESCRIPTION OF THE DRAWINGS

The aspects of this invention will be better understood from the following detailed description taken in conjunction with the drawings wherein.

DETAILED DESCRIPTION OF THE PREFERRED EMBODIMENTS

Discussion of the particular apparatus will be given herein with respect to specific functional tasks or task groupings that are in some cases arbitrarily assigned to illustrated modules for explanatory purposes. It will be appreciated by the person having ordinary skill in the art that aspects of the present invention may be arranged in a variety of ways, or that functional tasks may be grouped according to other nomenclature or architecture than is used herein without doing violence to the spirit of the present invention.

Figure 1:
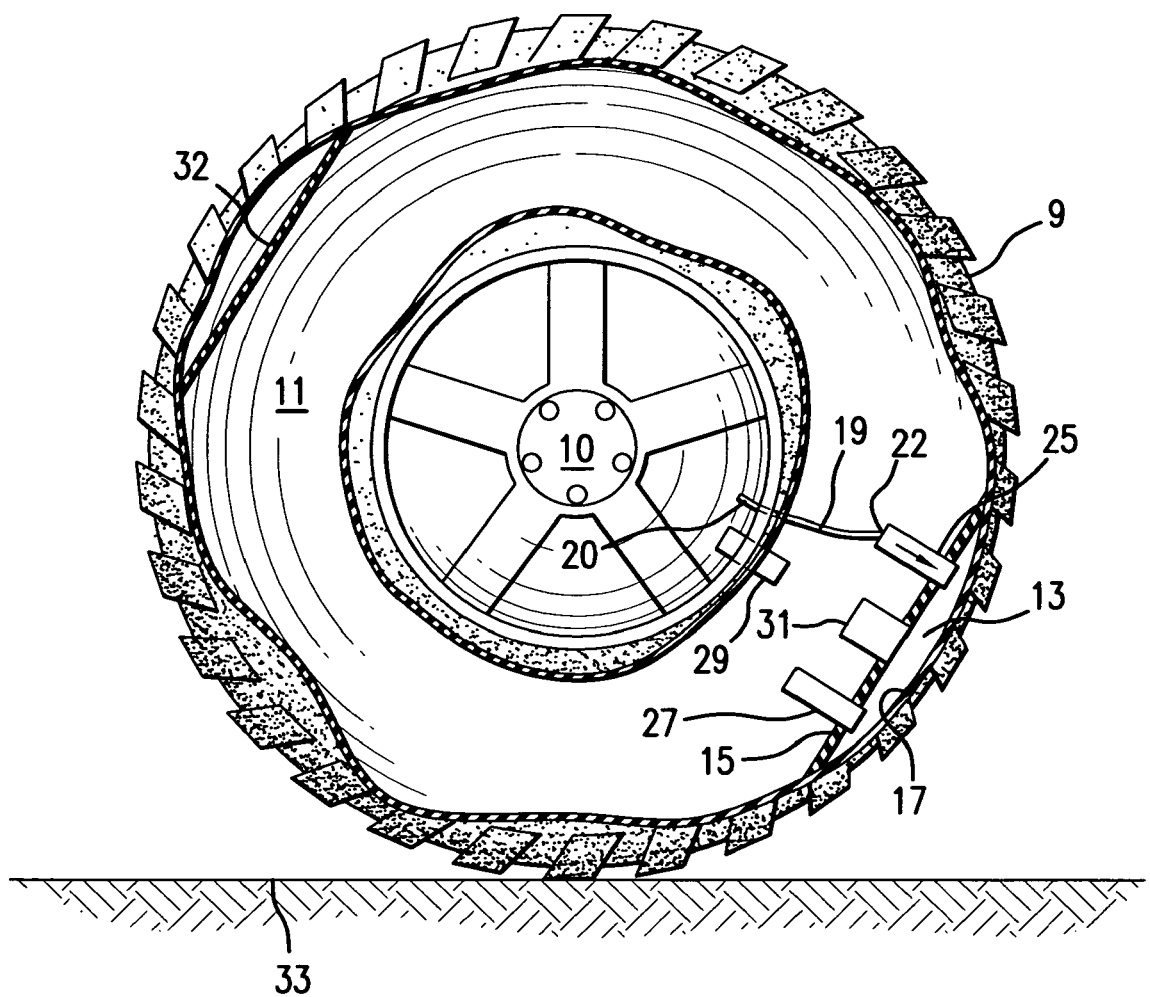
FIG. 1 illustrates the interior of a tire having an automatic inflation means according to the present invention, with the pump chamber in the uncompressed state.
Figure 2:
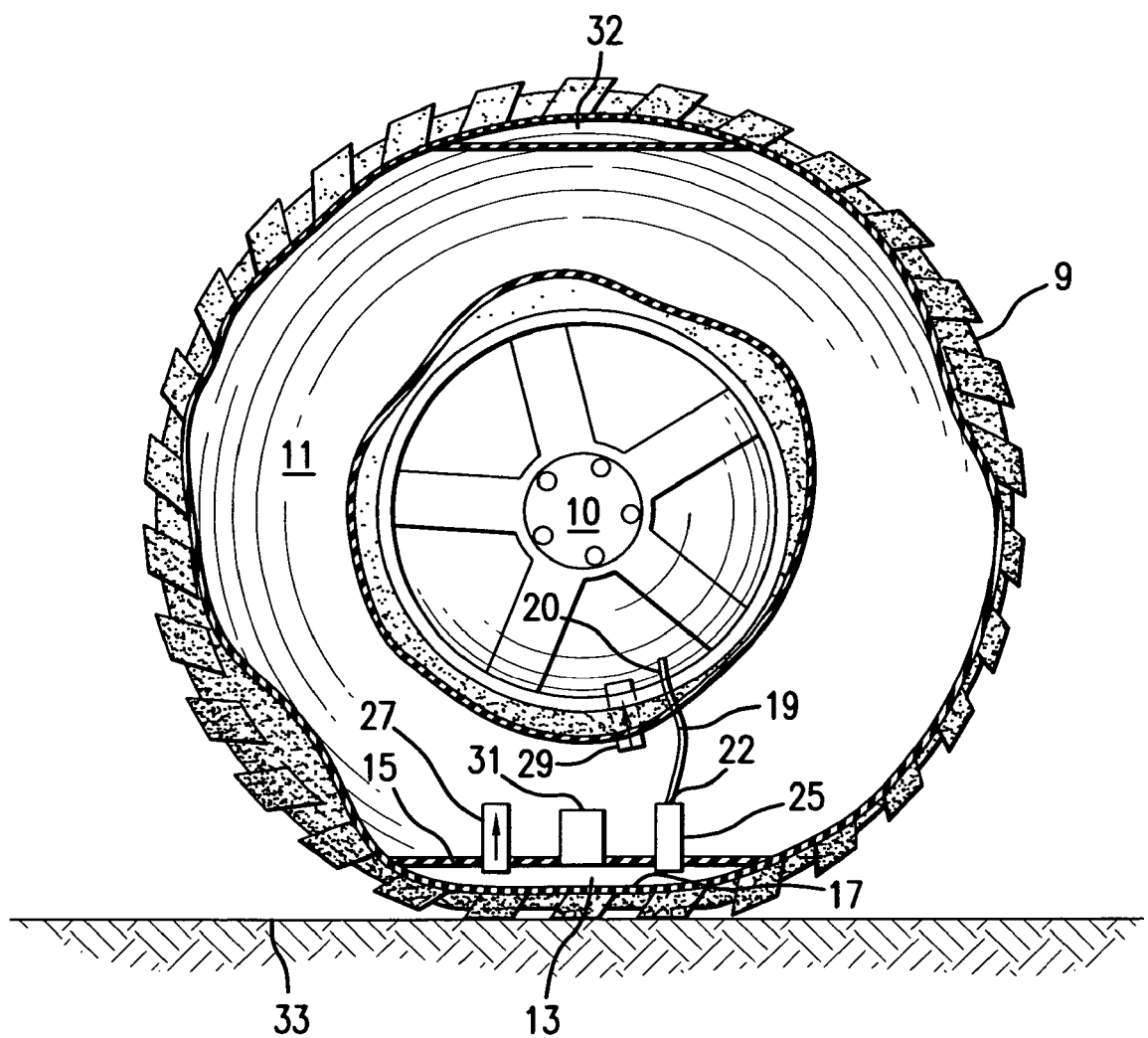
FIG. 2 illustrates the interior of a fire having an automatic inflation means according to the present invention, with the pump chamber in the compressed state.
Figure 3:
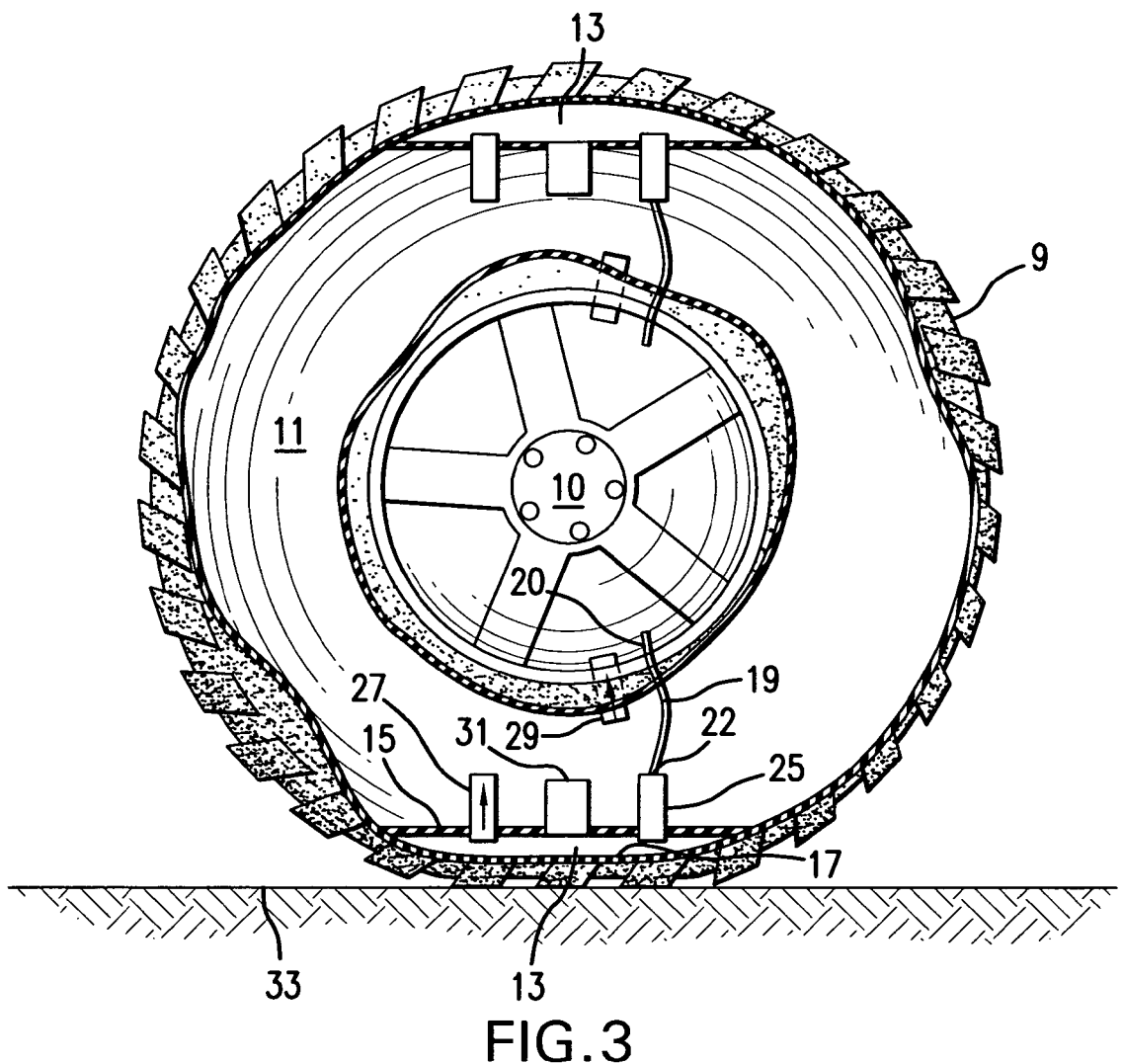
FIG. 3 illustrates the interior of a tire having diametrically opposed automatic inflation means.

As seen in FIGS. 1-3, a pneumatic tire 9 mounted on a wheel 10 defines an outer or main chamber 11 serving as the larger operative volume of the tire 9 and which contains a compressible fluid such as air which is to be maintained at a specific pressure. An inner or pump chamber 13, serving as the compression or fluid pump means, is located within the tire 9 and adjacent the outer chamber 11. The pump chamber 13 comprises a rigid wall 15 providing an air tight seal between the main chamber 11 and the pump chamber 13, and a resilient and flexible wall 17, in this case the tread portion of the tire 9, that is deformed under use. It will be appreciated that flexible wall 17 may be either of a separate layer or integral with the tire wall so long as its deformation is under the influence of a deformable portion of the tire 9. The fluid is compressed between the rigid wall 15 and the flexible wall 17 by tread deformation under tire use, as seen in FIG. 2, to a sufficient extent that the fluid reaches or exceeds the desired pressure in the main chamber 11. The flexible wall 17 must be sufficiently resilient to allow the pump chamber 13 to refill with fluid when it is not under compression, such as seen in FIG. 1, while the rigid wall 15 must be sufficiently rigid and airtight as to allow a pressure build up within the pump chamber 13 when the flexible wall 17 undergoes deformation. The area of the plane surface of the rigid wall 15 bisecting the toroid of the tire 9, and its exact rigidity or other physical characteristics, may be varied according to the necessities of the particular application while remaining within the spirit of the present invention.

As seen in FIGS. 1-3, the tread wall or vessel wall can be generally circular, such as forming a pneumatic tire 9. The rigid wall 15 forms a chord with respect to the generally circular vessel wall portion or tread wall, for example, to bound a segment of a circle by an arc of the generally circular vessel wall portion or tread wall and the rigid wall 15. The segment bounds or forms the pump chamber 13.

A fluid channel 19 having a first end 20 open to the exterior of the tire 9, and a second end 22 open to the interior of the tire 9, admits ambient or lower pressure air from the environment into the pump chamber 13 from the exterior of the tire 9, i.e., the atmosphere. A first one-way, i.e., check, valve 25 located on the rigid wall 15 is connected to the fluid channel second end 22 and allows the fluid to pass from the atmosphere into the pump chamber 13 while it is at a first uncompressed volume, but prevents fluid flowing in the reverse direction. This first check valve 25 could be a simple valve or a more complex part of a pressure sensing and control system, as further explained below.

A second check valve 27 allows the fluid to pass from the pump chamber 13, while the pump chamber 13 is at a second compressed volume less than the first volume, to the main chamber 11, but prevents fluid flowing in the reverse direction. This second valve 27 could be a check valve with a selected pressure set point or a more complex and variable part of a pressure sensing and control system, as further explained below with respect to FIG. 4.

A pressure control system is necessary to maintain the correct pressure and prevent over-inflation in the main chamber 11 by either allowing fluid to escape the main chamber 11 or preventing fluid from passing from the pump chamber 13 to the main chamber 11, or both. One implementation for pressure control can be a simple pressure relief valve 29 from the main chamber 11 to the atmosphere that would allow fluid to escape the main chamber 11 if the pressure exceeds a selected setpoint. In practice such a device would be a desirable failsafe in case of a pumping system regulation failure.

Figure 4:
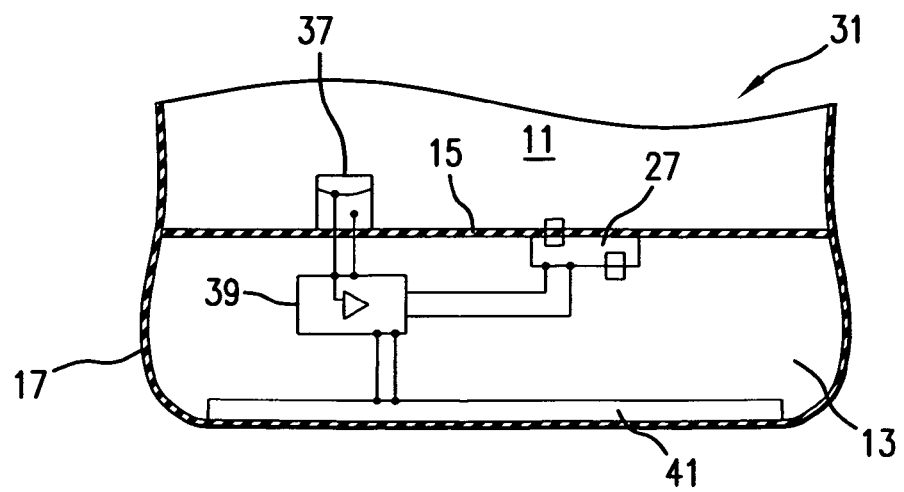
FIG. 4 illustrates a sensing and control mechanism for variable pressure set point regulation.

Referencing also FIG. 4, another pressure control implementation system 31, in lieu of, or in addition to, the relief valve 29, could include sensing and control apparatus such as a micro-diaphragm 37 for measuring the pressure of the main chamber 11 and blocking the flow of fluid from the pump chamber 13 through the rigid wall 15 to the main chamber 11 when the correct tire pressure setpoint is reached, such as by closing the second check valve 27 which, as illustrated here, may be a controllable pressure set point valve such as a variable piezoelectric valve controlled by a microelectronic circuit 39 and powered by flexure of a piezoelectric element 41 incorporated into the flexible vessel wall 17 or the like. The more elaborate apparatus could permit variation in the selection of the pressure setpoint from outside of the tire by inductive coupling of a remote control mechanism or other means. A similar mechanism may be suitably employed to actively control the pressure set point of the relief valve 29 of the main chamber. Specific embodiments of such pressure control implementation systems may depend upon application specific requirements and are considered to be within the ordinary skill in the art.

As shown in FIG. 3, the pump chambers 13 are desirably distributed in diametrically opposite pairings around the inner circumference of the tire 9 so as to maintain tire balance. However, if only one pump chamber 13 is desired, such as shown in FIG. 1 and FIG. 2, a counterweight 32 can be installed. The pump chambers 13 could be contained within the tire tread or belts, or desirably formed within or affixed to the inner surface of the tread wall. A preferred location would have the advantage of being compatible for and not interfering with the common practice of re-treading truck tires.

In operation of the tire 9, the pump chambers 13 gather ambient air while in their first larger and uncompressed volume such as shown in FIG. 1. The pump chambers 13 are then compressed to their second lesser volume through direct pressure or flexure of the flexible and resilient wall 17 when in contact, or nearly in contact, with the road 33. Deformation of the tires 9 is largest when the tire 9 is under-inflated. Thus, the air is pressurized in the pump chamber 13 by deformation of the flexible wall 17 and is allowed to pass into the main chamber 11 of the tire 9 by means of the second one-way valve 27, thereby increasing the tire pressure. As the tire 9 continues its rotation, the pump chambers 13 are no longer under compression, and therefore again expand to draw in air from outside the tire 9 through the fluid channel 19. Fluid channel 19 could be easily embodied by modifying a standard tire valve stem assembly, or by other means. Each pump chamber 13 will be compressed at each rotation of the tire 9. Alternatively, a continuous pump chamber with internal valves distributed around the whole circumference (not shown) is a possible implementation that would be intrinsically balanced.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A self-inflating vessel, comprising:
   a) a generally circular vessel wall portion being inwardly deformable;
   b) a main chamber within the vessel;
   c) a substantially planar rigid airtight wall located adjacent the vessel wall and forming a chord with respect to the generally circular vessel wall portion, wherein a segment bounded by an arc of the generally circular vessel wall portion and the substantially planar rigid airtight wall forms a compressible pump chamber within the vessel and having a first volume when the vessel wall portion is undeformed and a second lesser volume when the vessel wall portion is deformed inwardly;
   d) first valving allowing the one-way intake of fluid from the exterior of the vessel into the compressible pump chamber when the pump chamber is at the first volume; and
   e) second valving allowing the one-way outflow of compressible fluid from the pump chamber into the main chamber when the pump chamber is at the second volume.

2. The self-inflating vessel according to claim 1, further comprising:
   a relief valve for venting the main chamber to prevent over-inflation thereof.

3. The self-inflating vessel according to claim 2, wherein the compressible fluid is ambient air.

4. The self-inflating vessel according to claim 2, wherein the relief valve has a controllable pressure set point.

5. The self-inflating vessel according to claim 2, wherein the fluid is compressible.

6. The self-inflating vessel according to claim 5, wherein the compressible fluid is ambient air.

7. The self-inflating vessel according to claim 6, further comprising:
   a fluid channel from an exterior of the vessel to the pump chamber.

8. The self-inflating vessel according to claim 7, wherein the relief valve has a controllable pressure set point.

9. The self-inflating vessel according to claim 8, wherein the second valve has a controllable pressure set point.

10. The self-inflating vessel according to claim 9, wherein the vessel is a tire.

11. The self-inflating vessel according to claim 10, wherein the vessel wall portion is a tread wall portion.

12. The self-inflating vessel according to claim 1, wherein the fluid is compressible.

13. The self-inflating vessel according to claim 1, further comprising:
    a fluid channel from an exterior of the vessel to the pump chamber.

14. The self-inflating vessel according to claim 1, wherein the vessel is a tire.

15. The self-inflating vessel according to claim 14, wherein the vessel wall portion is a tread wall portion.

16. The self-inflating vessel according to claim 1, wherein the second valve has a controllable pressure set point.

17. A pneumatic tire comprising:
    a) a generally circular tread wall and sidewalls defining a space therebetween, at least one of the tread wall and the sidewalls being a deformable member;
    b) a main chamber in the space;
    c) a rigid airtight wall extending between two portions of the tread wall and forming a chord with respect to the generally circular tread wall wherein a segment bounded by an arc of the generally circular tread wall and the rigid airtight wall forms a compressible pump chamber in the space located adjacent the deformable member and having a first volume when the deformable member is undeformed and a second lesser volume when the deformable member is deformed inwardly during use of the pneumatic tire;
    d) first valving allowing the one-way intake of ambient air into the compressible pump chamber when the pump chamber is at the first volume; and
    e) second valving allowing the one-way outflow of ambient air from the pump chamber into the main chamber when the pump chamber is at the second volume to increase the air pressure in the main chamber.

18. A pneumatic-tired wheel comprising:
    a) a wheel;
    b) a tire mounted to the wheel thereby forming an enclosed space for containing a volume of air at a desired pressure, the tire having a generally circular tread wall and sidewalls, at least one of the tread wall and the sidewalls being a deformable member;
    c) a main chamber within the enclosed space;
    d) a pump chamber within the enclosed space positioned adjacent the main chamber, the pump chamber including a generally rigid airtight wall extending between two portions of the generally circular tread wall and separating the pump chamber and the main chamber, wherein the generally rigid airtight wall forms a chord with respect to the generally circular tread wall which along with the an arc of the generally circular tread wall bounds a segment to form the pump chamber, and a flexible and resilient wall that is deformed inwardly under the influence of the deformable member to compress the pump chamber;
    e) a channel extending between the pump chamber and an exterior of the tire for admitting ambient air into the pump chamber;
    f) a first valve positioned between the pump chamber and an exterior of the tire, the first valve permitting fluid to pass from the exterior into the pump chamber while the pump chamber resilient wall is not deformed inwardly, but preventing fluid flow in the reverse direction;
    g) a second valve having a pressure set point and being positioned between the pump chamber and the main chamber, the second valve permitting fluid to pass from the pump chamber to the main chamber while the pump chamber resilient wall is deformed inwardly, but preventing fluid flow in the reverse direction, to increase the air pressure in the main chamber; and h) a relief valve having a pressure set point for venting air from the main chamber to the atmosphere to maintain the proper air pressure in the main chamber.

19. The pneumatic-tired wheel according to claim 18, wherein the pump chamber resilient wall is a part of the deformable member.

* * * * *